(12) United States Patent  (10) Patent No.: US 8,529,190 B2
Naumenko  (45) Date of Patent: Sep. 10, 2013

(54) WIND TURBINE ROTOR WITH VERTICAL ROTATION AXIS

(75) Inventor: Anatoliy Naumenko, Cracow (PL)

(73) Assignee: Anew Institute Sp. z o.o., Kraków (PL)

( * ) Notice: Subject to any disclaimer, the term of this patent is extended or adjusted under 35 U.S.C. 154(b) by 634 days.

(21) Appl. No.: 12/751,844

(22) Filed: Mar. 31, 2010

(65) Prior Publication Data

US 2010/0266413 A1  Oct. 21, 2010

(51) Int. Cl.
   *F03D 7/06*  (2006.01)
(52) U.S. Cl.
   USPC ............................................. 415/4.2; 416/203
(58) Field of Classification Search
   USPC ................ 415/4.2, 4.4, 907; 416/203, 210 R
   See application file for complete search history.

(56) References Cited

U.S. PATENT DOCUMENTS 4,130,380 A * 12/1978 Kaiser ........................ 416/197 A
4,264,279 A    4/1981 Dereng
4,430,044 A    2/1984 Liljegren
4,456,429 A *  6/1984 Kelland ........................ 416/117
4,976,587 A * 12/1990 Johnston et al. ............... 416/230

* cited by examiner

*Primary Examiner* — Dwayne J White
(74) *Attorney, Agent, or Firm* — John Alumit

(57) ABSTRACT

A wind turbine rotor with a vertical rotation axis connected to a hub having at least two horizontal supports, on the ends of which are tightly fixed blades, each consisting of two wings joined together, with a symmetrical or concavo-convex airfoil with the airfoil's chord lengths and thickness diminishing toward both wing ends. The rotor blade's upper and lower wings are radially deflected from the central zone outwards. The chord length of both wing ends and the chord length in the central zone are approximately inversely proportional to the radii of its location in relation to the axis of the rotor's rotation. The deflecting angle of the lower wing can be greater than the deflecting angle of the upper wing or the length of the lower wing can be greater than the length of the upper wing. These specifications provide uniform wind power consumption along the wing's length, increasing the efficiency of a wind turbine and its service life.

6 Claims, 2 Drawing Sheets

WIND TURBINE ROTOR WITH VERTICAL ROTATION AXIS

CROSS-REFERENCE TO RELATED APPLICATION

This application claims the benefit of the priority filing date in PCT/PL2008/000078 referenced in WIPO Publication WO/2009/099344. The earliest priority date claimed is Feb. 8, 2008.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention is a wind turbine rotor with a vertical rotation axis, used in turbines applying the Darrieus' principle while processing wind energy into mechanical energy from the movement of rotation.

Solutions of turbine rotors with a vertical rotation axis are known. For example, U.S. Pat. Nos. 4,264,279 and 4,430,044 have at least two horizontal supports with vertically mounted rotor blades on the ends that are connected with the hub of the drive shaft. Rotor blades have mostly a symmetrical airfoil and are connected with a support in the center zone in relation to their height, with the division of the blade into an upper wing and a lower wing. During rotor movement exerted by wind pressure, there is both a driving aerodynamic force and a centrifugal force. Both forces act in the centers of the mass of the two wings. In the middle of the trajectory of the blade rotation movement, the aforementioned forces are directed at the same direction—resulting in longitudinal deformation of the wings and high bending stress in the connection zone of the blade and support. On the other half of the circle, on the side of the wind direction, both of these forces are in reverse.

The pulsating load changes, including polarity changes, that appear have a significantly adverse effect on turbine wear and equipment efficiency. Known solutions consist of inserting additional elements into the construction of the rotor in order to stiffen the wings. For example, British Patent GB 2175350t describes line tie rods like the rotors, or additional supports, disclosed in the German Patent DE 3626917. The introduction of the strengthening elements results in an increase in aerodynamic drag and a decrease of turbine efficiency, especially if they include acutely angled forms that facilitate volumetric turbulence. The adverse effect of the centrifugal force leads to a partial reduction in the application of the changeable airfoil on the rotor length, with the length of the chord and the thickness of the airfoil decreasing towards both wing ends. Such solution, among others, was applied in the rotor disclosed in the patent description of EP 0046370. In the brief description of the working conditions and technical problems appearing in these kinds of rotors, it is necessary to indicate the diversity of aerodynamic force on the upper and lower wings and the construction susceptibility to self-excited aeroelastic vibrations (i.e., the flutter of wings at high speeds of the surrounding air). The characteristics of the area may often determine whether there is a substantial decrease of wind speed at the lower wing level.

The aim of this invention is to draw up a simple construction of a rotor, characterised by high stiffness and durability, low aerodynamic drag, and high efficiency of wind pressure transformation on the driving force of the rotor shaft.

In this invention, like to the above disclosed solutions, the rotor involves at least two horizontal supports connected to the hub. Rotor blades (each consist of two wings joined together) with a symmetric or concave-convex airfoil, with chord lengths and airfoil thickness decreasing toward both wing ends, are fixed tightly to the ends of the supports. The essence of the invention is that the upper and lower wings of the rotor blade deflect from the central zone radially outward at the angle relative to the axis of rotation. At the same time, the chord lengths of the airfoil at both wings' ends and the chord length in the central zone are approximately inversely proportional to the radii of their location relative to the axis of rotation.

The use of a rotor with deflected wings whose airfoil decreases in chord and thickness towards their span from center to tips, provides a stable intensity of wind power consumption along the length of the wings. Altering the wing airfoil chord and thickness, by moving the center of the wings mass closer to the center of the blade, decreases the bending moment caused by centrifugal forces directed at the wings which cause their deformation. The frequency of free blade vibrations is higher with deflected wings whose airfoil decreases in chord and thickness than in the case of straight blades. This facilitating result is particularly visible during gust winds. The deflected wings introduce an aerodynamical twist, that is, the angle of incoming air flow near the central zone of the wing is bigger than at the wings ends. The diversity of angle attack, in practice, eliminates the danger of flutter.

Further embodiments of the invention aim to eliminate the influence of different wind speeds that appear at the upper and lower levels of the rotor. To that end, the angle of deflection of the lower wing in the rotor should be larger than the angle of deflection of the upper wing. The advised angle difference is in the range of 1° to 5°.

The solution in which the lower wing is longer than the upper one is also beneficial. The recommended length difference is in the range of 2% to 15%.

In accordance with the invention, it would be advisable to use supports in the rotor with a symmetrical airfoil and horizontally placed chords, as well as a connection with the hub such that the longitudinal axes goes through the geometrical center of the airfoils, and intersects the axis of rotation.

The rotor works most efficiently when attacked by airflow at optimal angles, it is also useful to connect the driving blades to the supports using known set points of attack angles, which enable regulation in the range of −2° to +3°.

SUMMARY

The invention is a wind turbine rotor with a vertical rotation axis, used in turbines applying the Darrieus' principle while processing wind energy into mechanical energy from the movement of rotation.

The aim of this invention is to draw up a simple construction of a rotor, characterised by high stiffness and durability, low aerodynamic drag, and high efficiency of wind pressure transformation on the driving force of the rotor shaft.

In this invention, like to the above disclosed solutions, the rotor involves at least two horizontal supports connected to the hub. Rotor blades (each consist of two wings joined together) with a symmetric or concave-convex airfoil, with chord lengths and airfoil thickness decreasing toward both wing ends, are fixed tightly to the ends of the supports. The essence of the invention is that the upper and lower wings of the rotor blade deflect from the central zone radially outward at the angle relative to the axis of rotation. At the same time, the chord lengths of the airfoil at both wings' ends and the chord length in the central zone are approximately inversely proportional to the radii of their location relative to the axis of rotation.

The use of a rotor with deflected wings whose airfoil decreases in chord and thickness towards their span from center to tips, provides a stable intensity of wind power consumption along the length of the wings. Altering the wing airfoil chord and thickness, by moving the center of the wings mass closer to the center of the blade, decreases the bending moment caused by centrifugal forces directed at the wings which cause their deformation. The frequency of free blade vibrations is higher with deflected wings whose airfoil decreases in chord and thickness than in the case of straight blades. This facilitating result is particularly visible during gust winds. The deflected wings introduce an aerodynamical twist, that is, the angle of incoming air flow near the central zone of the wing is bigger than at the wings ends. The diversity of angle attack, in practice, eliminates the danger of flutter.

DETAILED DESCRIPTION

A rotor is fixed onto a hub 1 of a driving shaft bearing vertically in the tower of a wind turbine 4. Two horizontal supports 2, with a symmetrical airfoil are fixed to the hub 1.

Figure 1:
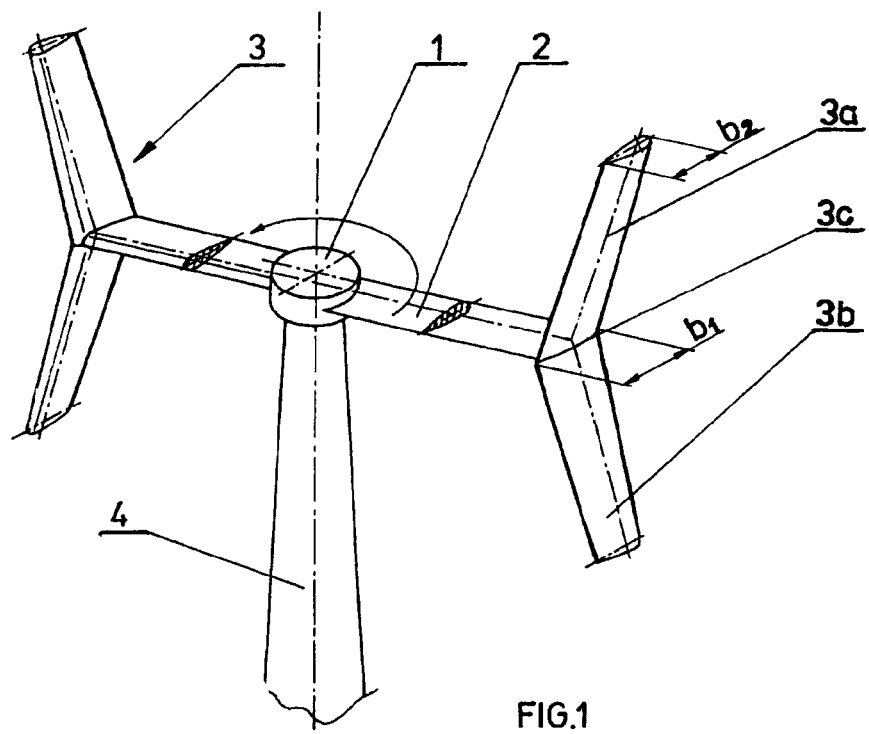
FIG. 1—perspective view of the rotor with deflected wings.
Figure 2:
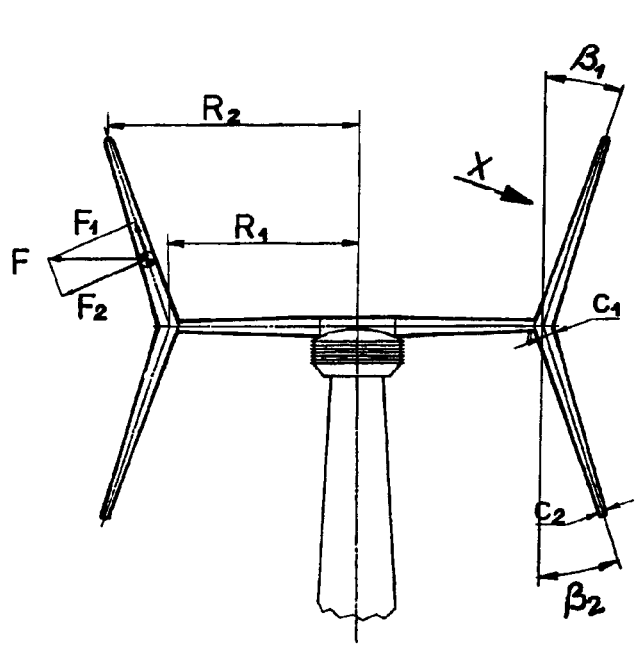
FIG. 2—the view from the side.
Figure 3:
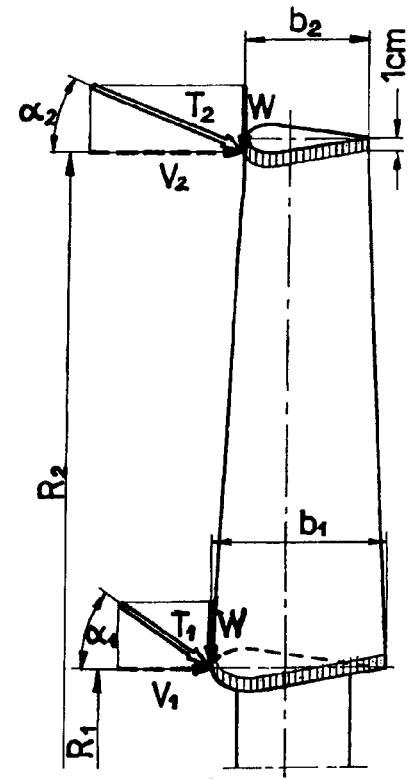
FIG. 3—the view of the wing from the direction marked with the letter X on the FIG. 2, FIG. 4—the view on the other rotor with wings of different length and varied deflection angles of upper and lower wings.

The longitudinal axis of the supports goes through the geometrical center of the supports' airfoil, intersecting the axis of rotation of the rotor. The rotor blades 3 are fixed at the ends of each support 2. The blades are connected to the supports 2 at the center zone 3c of its own length. The upper wing 3a and the lower wing 3b of the rotor blade 3 have the same length. Both wings are deflected radially outward and the angle relative to the axis of rotation is $\beta_1=\beta_2$. The cross sections of the upper wing 3a and the lower wing 3b have a symmetrical or concave-convex airfoil with chord lengths from $b_1$ to $b_2$ and the airfoil thickens decreases towards both wings' ends from $c_1$ to $c_2$. The chord lengths $b_2$ of the airfoil at both wings' ends 3a, 3b and the chord length $b_1$ in the center zone 3c are inversely proportional to the radius $R_1, R_2$ of their location, relative to the axis of rotation, as expressed in the relation: $b_1/b_2=R_2/R_1$. When land form features apply to such dimensional and shape relations, the wind power consumption is stable along the entire length of the wing and, at the same time, the angle of air attack $\alpha_1, \alpha_2$ of the resultant speed $T_1, T_2$ of the airflow along the wing decreases. FIG. 3 shows where particular elementary surfaces of the wings, symbolically marked "1 cm" should generate the identical aerodynamic force, according to the formula:

$$Y=C_y \times S \times \rho \times V^2/2,$$

where $C_y$—coefficient that is dependent on the shape of the airfoil and an angle of the incoming airflow, S—area of the elementary surface of the wing, $\rho$—air density, V—speed of the incoming airflow Near the central zone 3c, the value of $C_y \times S$ is higher than at the end of the wing, where $V^2$ is a predominant value. In the case of gust winds, the angle of air attack a may exceed the critical value. By changing the value of the deflection of the wing and sizes of the chord, the central zone, and the wing ends, it's possible to reach an even distribution of the aerodynamic force along the wing.

In the rotor, in accordance with the invention, the angle of incoming airflow decreases continuously from $\alpha_1$ in the center zone 3c to $\alpha_2$ at the ends of the wing 3a, 3b—creating an aerodynamic twist. The wing with the aerodynamic twist has its critical angle of attack starting at the central zone and gradually can reach the end of the wing. For this reason, the creation of a turbulence zone behind the wings is gradual in character and does not provoke pulsation in turbines or vibrations of the tower 4 and supports 2, characteristics not present in turbines with straight blade rotors.

The outside deflection of the wing 3a, 3b allows for the shortening of the support 2 appropriately—which reduces the aerodynamic drag of the turbine.

Figure 4:
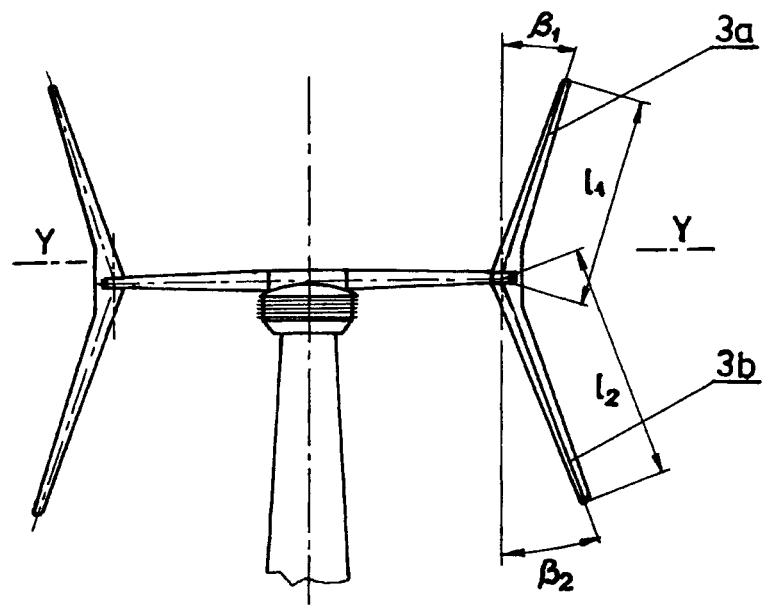

FIG. 4 shows the rotor adapted to balanced wind power consumption through the upper wing 3a and lower wing 3b. The wind speed is significantly diversified depending on the height above ground level. The difference between the aerodynamic forces appearing on the lower wing 3b and upper wing 3a creates adverse bending moment on the supports.

The balance of aerodynamic forces can be ensured with the use of a larger (for example) 3° deflection angle $\beta_2$ of the lower wing 3b than the deflection angle $\beta_1$ of the upper wing 3a, while maintaining equal lengths of the wing $I_1=I_2$. An increase of the deflection angle value increases the circumferential speed of the lower wing, causing the aerodynamic forces generated by the upper and lower wings to become equal. The load balance of the upper 3a and lower 3b wing can be also achieved at equal deflection angles $\beta_1=\beta_2$ but at a longer, lower wing 3b length $I_2$—for example about 10% longer than the length $I_1$ of the upper wing 3a.

Figure 5:
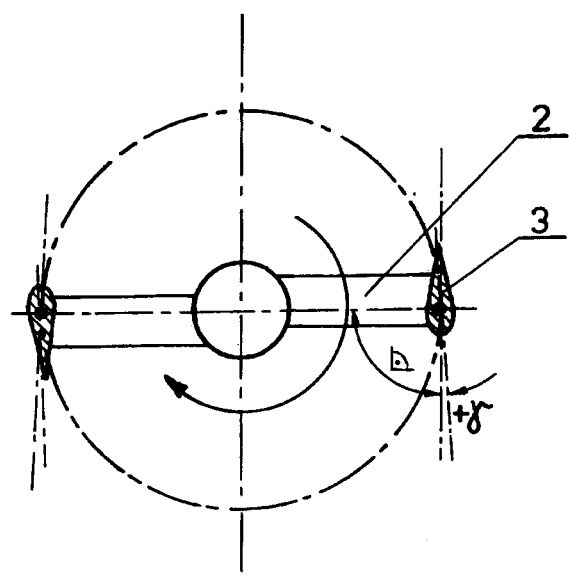
FIG. 5 shows the view from above on the rotor in its section according to the line Y-Y marked on the FIG. 4.

Testing of the rotor prototype, as specified in the invention, revealed that the maximum efficiency of power conversion for different wind speeds W is achieved at different angles of attack $\gamma$, between the center zone chord 3c and the tangent line to the trajectory of movement of this section, FIG. 5. For example, where wind speed W=6 m/s, angle=−2°, W=9.5 m/s $\gamma$=0° and W=11 m/s $\gamma$=+2°. The rotor that is the subject of the invention is equipped with one of the known solutions built into the support 2, which allows for changing the attack angle $\gamma$ during operation of the turbine.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A wind turbine rotor with a vertical rotation axis having connected to a hub, at least two horizontal supports, on the ends of which, are rotor blades fixed tightly in their central zone to the support's ends, each rotor blade consisting of two wings joined together each with a cord length and airfoil thickness, whose traverse sections have a symmetrical or concavo-convex airfoil, wherein the length of the chord and the thickness of the airfoil diminishes towards the wings' ends, characterized by the fact that an upper wing (3$a$) and a lower wing (3$b$) of the rotor blade (3) radially deflect from the central zone (3$c$) outwards, forming a deflecting angle ($\beta$1, $\beta$2) towards the axis of rotation of the rotor, where the length of the chord (b2) of the airfoil at both wing ends (3$a$, 3$b$) and the length of the chord (b1) in the central zone (3$c$) are approximately inversely proportional to a radii (R1, R2) of their location in relation to the axis of rotation of the rotor; and wherein the deflecting angle of the lower wing is greater than the deflecting angle of the upper wing.

2. The rotor according to claim 1, wherein the deflecting angle of the lower wing is greater than by 1° to 5° than the deflecting angle of the upper wing.

3. The rotor according to the claim 1, wherein the length (l 1) of the lower wing (3$b$) is greater than the length (l 2) of the upper wing (3$a$).

4. The rotor according to the claim 1, wherein the length (l 1) of the lower wing(3$b$) is greater than the length (l 2) of the upper wing (3$a$).

5. The rotor according to claim 3, wherein the length of the lower wing is greater by 2 to 15% than the length of the upper wing.

6. The rotor according to claim 4, wherein the length of the lower wing is greater by 2 to 15% than the length of the upper wing.

* * * * *